Oct. 30, 1951　　　　M. QUESNOIT　　　　2,572,945
WHEELED BARROW
Filed April 18, 1950　　　　　　　　　　3 Sheets-Sheet 1

INVENTOR:
Maurice Quesnoit
By Richardson, David & Jordan
his Attys.

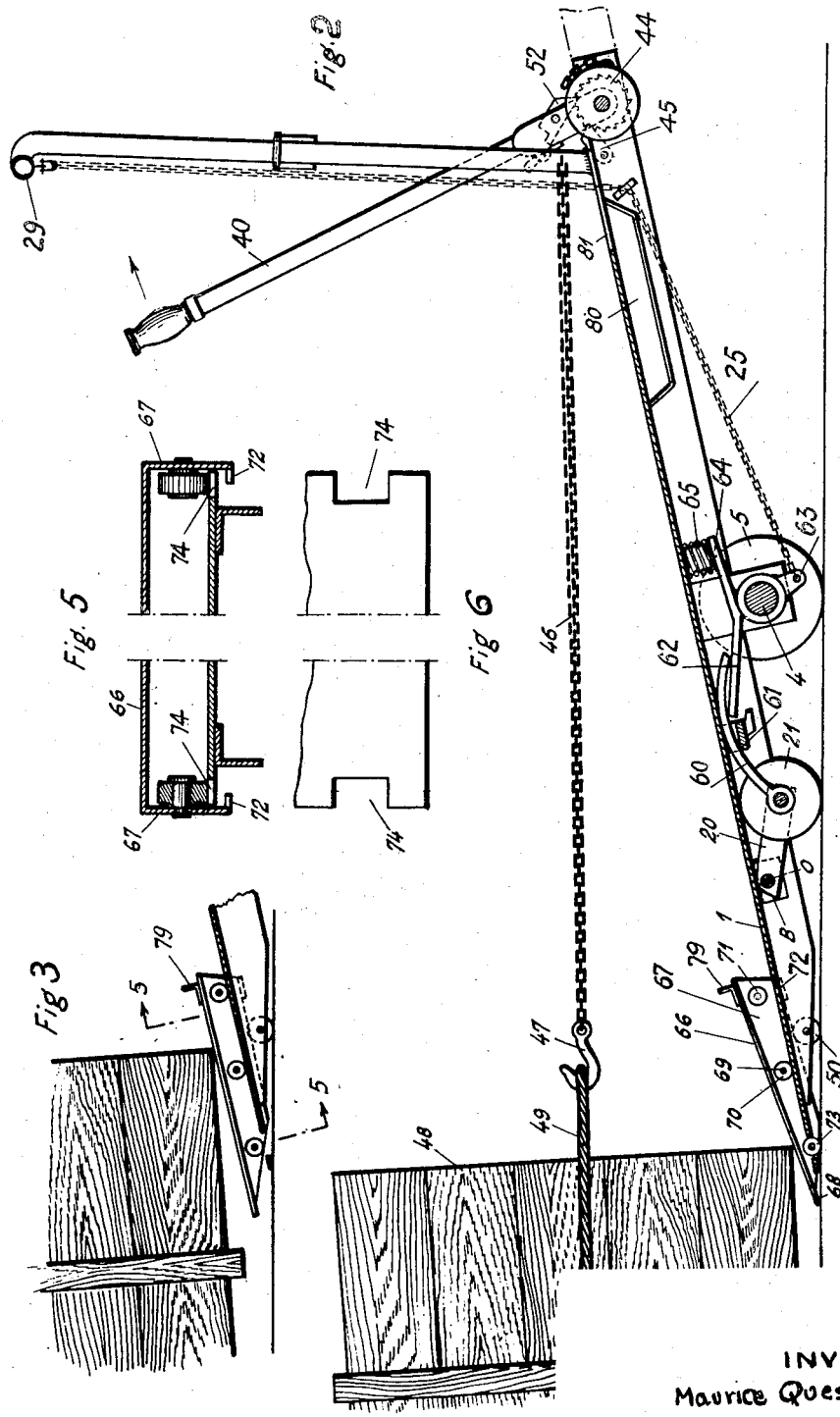

Oct. 30, 1951 M. QUESNOIT 2,572,945
WHEELED BARROW
Filed April 18, 1950 3 Sheets-Sheet 3

INVENTOR
Maurice Quesnoit
By Richardson, David & Nordon
his Att'ys.

Patented Oct. 30, 1951

2,572,945

UNITED STATES PATENT OFFICE 2,572,945

WHEELED BARROW

Maurice Quesnoit, Croix, Nord, France

Application April 18, 1950, Serial No. 156,602
In France April 29, 1949

7 Claims. (Cl. 214—85)

This invention relates to a wheeled barrow adapted to handle loads of any type and, more particularly, heavy objects such as packages, cases, baskets, machinery, etc.

The purpose of this invention is to facilitate the loading and unloading of the objects to be handled, while ensuring in the same time their easy transportation during which the load is entirely supported by the barrow, the operator acting only to drive the barrow without having to support any load.

Many barrows, carriages, luggage-trucks and the like have been proposed in which the designers have tried to facilitate either the loading or the unloading or again the transportation, but it seems that none of the existing solutions is capable of resolving simultaneously the three problems.

The wheeled barrow according to the invention comprises essentially a flat platform on which articles of any shape can be loaded, a wheel-train substantially disposed in the middle of the platform along the direction in which the barrow is to be displaced and a second wheel-train disposed between the first train and the front edge of the platform, said second train being pivoted about an axis parallel to that of the first train and being so designed that it can assume two positions by pivoting around said axis, viz. a first position in which the platform is substantially parallel to the ground while resting on both said trains and a second position in which the platform is so inclined that its front edge is in the close vicinity of the ground (these two positions being called, in the following description, "running position" and "loading position," respectively), handling means such as a bar extending in a direction substantially parallel to the platform being provided towards the rear edge of the platform so as to permit an easy handling of the barrow.

According to a preferred embodiment of the invention, the axis of the main wheel-train is disposed slightly rearwards with respect to the centre of gravity of the unloaded barrow, thanks to which the front edge of the platform of said barrow tends to tilt forwards automatically to compel the front wheel-train to retract as soon as the same has been unlocked.

According to another feature of the invention, the front edge of the platform is so designed that it can come into contact with the ground, the longitudinal beams or other members integral with the platform having a shape adapted to this purpose.

According to a further feature of the invention, the front wheel-train is so designed that it is automatically brought into its running position under the action of gravity when the operator tilts the platform sufficiently rearwards around the axis of the main wheel-train and that it is locked also automatically once it has reached said running position.

According to still another feature of the invention, the wheeled barrow is provided with a winch on which a cable is wound, the load to be handled being hooked at the free end of said cable and by means for imparting to said winch a series of angular displacements in the winding direction of the cable with a considerable stress-multiplying, so as to give rise positively to a relative displacement between the load hooked at the end of the cable and the barrow platform in order to hoist said load on said platform.

According to a further feature of the invention, the wheeled barrow is provided with a loading carriage constituted by a plate having in the direction of the relative displacement between the load and the barrow platform, a relatively reduced size, said carriage comprising at least two rolling trains, the first one of which, in the loading position, projects out of the front edge of the platform, the carriage then pivoting about the axis of another rolling train and being locked in this projecting and inclined position so that the load to be hoisted on the platform slides upon the plate of the carriage until compelling the same to tilt about the above-mentioned axis, whereupon the load is made integral with the carriage and is subsequently moved with respect to the platform by rolling on the same through the rolling means of said carriage.

The invention will be best understood with reference to the accompanying drawings in which some embodiments of the invention are shown as a mere illustration.

In these drawings:

Fig. 2 is a generally longitudinal axial sectional view along line 2—2 of Fig. 1, of the front portion of the platform of this barrow, said barrow being shown in its loading position.

Fig. 3 is a partial view of said front portion during the second loading step.

Fig. 5 is a cross section along line 5—5 of Fig. 3 and

Fig. 6 is a plane view showing the front edge of the platform of the barrow shown in Figs. 2, 3 and 4.

Figure 1:
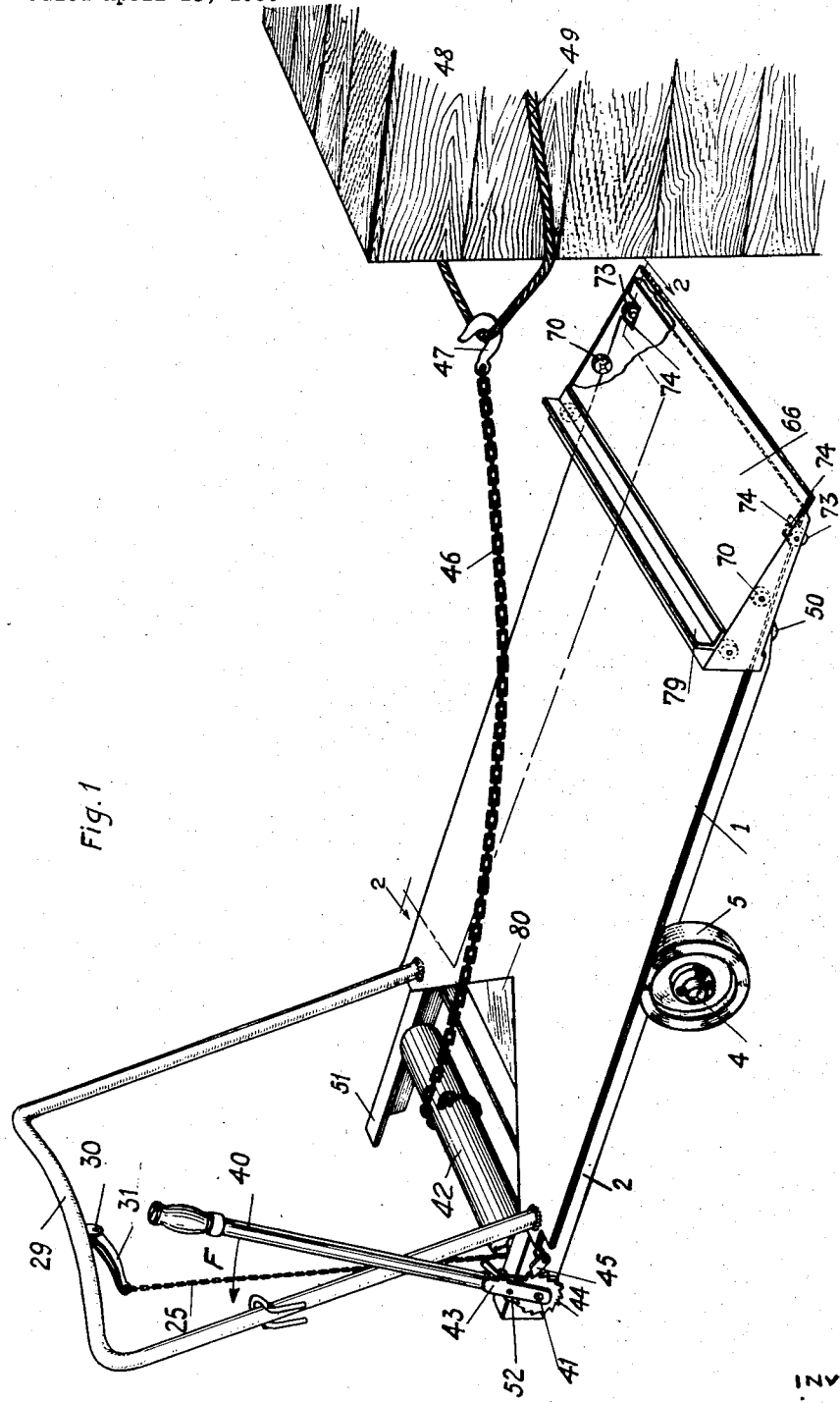
Fig. 1 is a perspective view of a wheeled barrow according to the invention.

Referring first to Fig. 1, there is shown at 1 the barrow platform secured on longitudinal beams 2 interconnected by cross members. On one of said cross members is secured the axle 4 of the wheels 5 of the main running train of the barrow. Said axle is disposed slightly rearwards with respect to the centre of gravity of the unloaded barrow in the direction in which the same is to be displaced so that, when unloaded, the barrow tends to tilt forwards while, when a load is brought towards the middle of the platform, the barrow may be easily and momentarily tilted rearwards around axle 4 in order to bring the front wheel-train into its running position, the above-mentioned slight rearward shift preventing, however, the barrow from completely tilting rearwards under the weight of the load.

Moreover, in order to suppress any risk in the case when said tilting should nevertheless occur, the barrow may be provided, according to another feature of the invention, with one or more safety rear rollers.

The barrow is supported, besides the main wheel-train described above, by a retractable front wheel-train 21 mounted on a support 20 articulated at O on platform 1 (see Figs. 2 and 4), the pivoting motion of said support being limited forwards by an abutment B. In the example shown in these figures, the locking of support 20 in the running position is effected by means of an arm 60 pivoted on the axle of wheels 21 and slidably engaged in a yoke 61 secured on the lower face of platform 1.

In the running position, the end of lever 60 comes into abutment against the end of a lever 62 pivoted about axle 4 of the main wheels of the barrow, said lever comprising two other arms 63 and 64, respectively.

Arm 63 is connected through a flexible link such as chain 25 to control lever 31 articulated at 30 on the handling bar 29 of the wheeled barrow, while arm 64 is urged resiliently, e. g. by a spring 65, towards the abutment position between the ends of levers 60 and 62.

Figure 4:
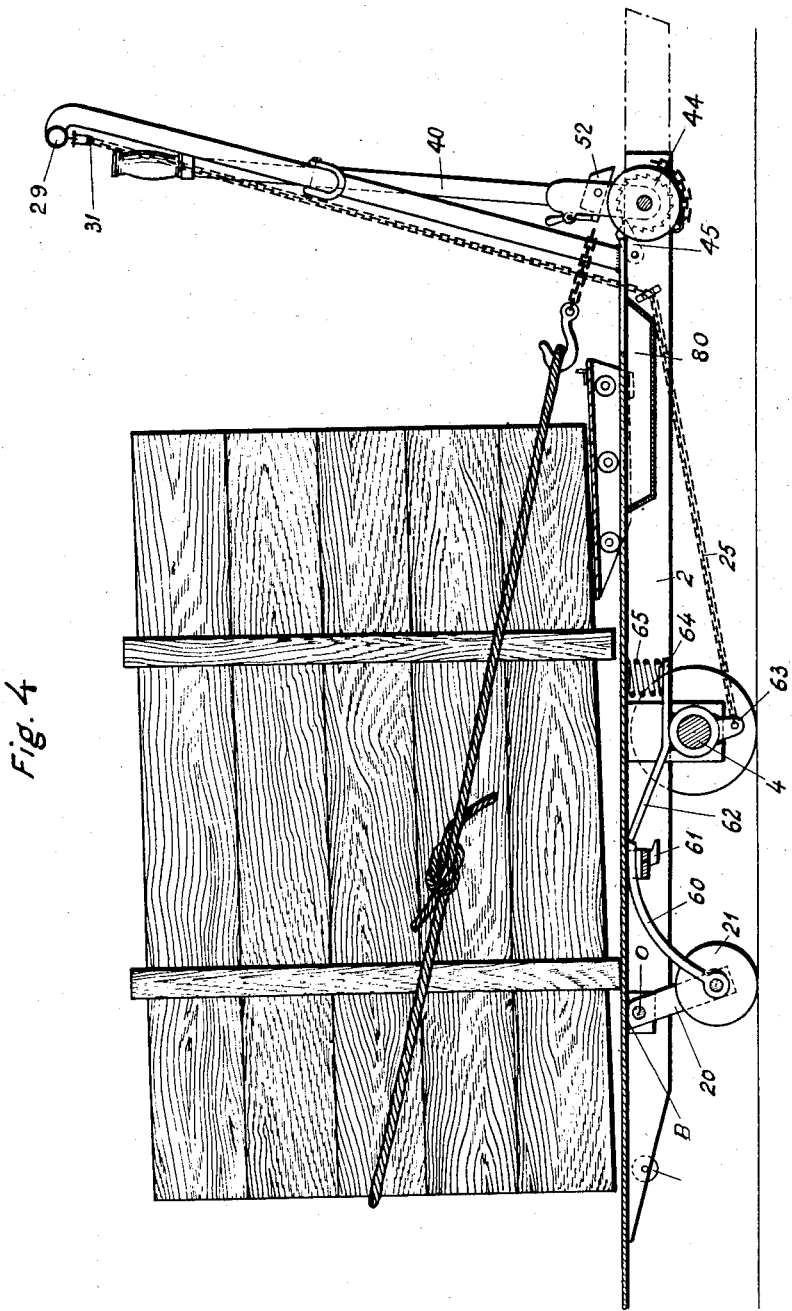
Fig. 4 is a view similar to Fig. 3, the wheeled barrow being shown in its running position.

In Fig. 2, the front wheel-train is shown in the retracted position and in Fig. 4, it is shown in the running position. It will be understood that for locking the train, it is only necessary to lift sufficiently the front edge of the platform, the wheel or wheels 21 then falling under the action of gravity into the running position and spring 65 ensuring their automatic locking in said position.

To unlock the front wheels, it is only necessary to exert on the flexible link 25 a very slight pulling stress sufficient to displace the end of lever 62 by a distance equal to the thickness of lever 60, the latter being thus released, the front wheel-train being then automatically retracted under the action of the downwards thrust exerted by the front portion of the platform which tends to pivot around axle 4 due to the fact that the balance of the device is thus destroyed.

The locking device which has just been described is only an illustrative embodiment and other mechanisms could be adopted, the essential requirements for the retractable wheel-train according to the invention being that it should be brought into the running position by merely lifting the front edge of the platform by pivoting it around axle 4, that it should be then locked in said position preferably in an automatic manner and that its unlocking requires but a reduced force, said train being retracted also automatically as soon as said unlocking has been effected, by the mere forward tilting of the front edge of the platform.

The above described wheeled barrow is also provided with means to be actuated by the operator and permitting, when the front edge of the platform has been brought under one edge of the object to be handled, to slidably hoist said object on the platform. In the example shown, said means are constituted by a winch actuated by means of a handle lever 40 having a considerable leverage and pivoted at 41, at its lower end, on the axis of a winch drum 42. Lever 40 is provided at its lower end with a fork 43 between the arms of which is mounted a ratchet wheel 44 rotatively fast with drum 42. A dog 52 disposed within fork 43 positively drives step by step the ratchet wheel 44 when lever 40 is actuated in the direction of arrow F (Fig. 1), while exerting no action upon said ratchet in the opposite direction; a second dog 45, while leaving the ratchet to be rotated freely when lever 40 drives the latter in the direction of arrow F, prevents positively the ratchet wheel from rotating in the opposite direction.

Thanks to this ratchet mechanism, a chain 46 is wound on drum 42 when lever 40 is actuated by successive oscillations, said chain thus hoisting the load by short unitary sliding displacements on the platform, a considerable stress-multiplying being ensured due to the high ratio between the length of lever arm 40 and the radius of drum 42.

Chain 46 is provided at its free end with a hook 47 for stowing any load such as a packing case 48. This operation may be effected either by directly surrounding the load with chain 46 and by securing hook 47 to one link of the chain or by using another chain or any suitable cable 49 secured in the same manner around the load and by securing hook 47 on one link of this chain or on said cable.

When the object has been brought near the middle of the platform, so that its centre of gravity is sufficiently near that of the barrow to permit the tilting of the same, this is done by bringing lever 40 to a rear position and by exerting on said lever a downwards push while pressing with one foot on an extension 51 (Fig. 1) of the left longitudinal beam of the platform and while exerting a rearwards pull on bar 29.

The conjugation of these three forces is sufficient to ensure the above-mentioned tilting, however high may be the weight of the load, the operation being made easier by the considerable leverage acting from the end of lever 40 at its rear position above the axle of the main running wheels of the barrow.

One or more rollers may be also provided in the vicinity of the front edge of the platform, as shown at 50, in order to facilitate the displacement of the wheeled barrow in its loading position.

To hoist a load such as 48 easier on platform 1, it is possible to provide on said platform longitudinal ribs facilitating the sliding operation.

It is also possible, according to a particular embodiment of the invention and as shown, to provide a loading carriage capable of rolling on the platform of the wheeled barrow in the direction in which the same is to be displaced and adapted to be interposed between at least a portion of the load to be handled and said platform.

In the example shown, said carriage is constituted by a plate 66 extending across the whole width of platform 1 of the barrow and comprising on either side flanges 67 folded by 90° downwards to guide the plate 66 along platform 1. Plate 66 is carried by at least two rolling trains, three in the example shown.

The size of plate 66 in the direction of the relative displacement between the load and the barrow platform during the loading operation is relatively small, as shown, so that the carriage is capable of moving along platform 1 from its front terminal position shown in Fig. 2, i. e. the loading position, to a position located on the rear portion of platform 1 and determined by the length of the load to be handled (see e. g. Fig. 4).

To load on a wheeled barrow comprising a loading carriage according to the invention any load such as the packing case 48, the wheeled barrow is brought into the position in which its front edge is in the close vicinity of the ground.

In this position, carriage 66 is brought, under the action of gravity, into the position shown in Fig. 2 in which its front edge 68 comes into contact with the ground, plate 66 pivoting around axle 69 of the intermediate rolling train 70, its rear edge being raised with respect to the surface of platform 1 and its rearmost rolling train 71 being taken off the platform. This tilting displacement is limited by lugs 72 provided on the rear portion of flanges 67, so that, in spite of the thrust exerted by load 48 upon the carriage, the latter does remain in the position of Fig. 2 as long as the load is not sufficiently engaged on plate 66.

According to another feature of the invention, the carriage is so designed that it is locked in said position until the desired moment.

In the embodiment shown, this locking is effected by the rollers of the front train 73 which are engaged, in the position of Fig. 2, the so-called loading position, into cut-off portions 74 provided on the edges of platform 1 in the neighbourhood of the front end of said platform.

When the load has been imparted with a certain relative displacement with respect to the barrow, it compels the carriage to tilt rearwards, said carriage coming then into the position shown in Fig. 3 in which rollers 73 of the front train are released from the cut-off portions 74, by pivoting around axle 69 of the intermediate train 70. From this position forward, the load is made integral with the carriage and rolls on platform 1 through the three rolling trains 70, 71 and 73 of the carriage (see Fig. 4). In the example shown, this is positively ensured by a flange 79 provided on the rear portion of plate 66. It will be easily understood that, thanks to the above described carriage, the loading and unloading are made materially easier, the resistance against the relative displacement between the load and the platform being thus considerably decreased.

According to an additional feature of the invention, there is provided on the rear portion of the platform and under the same a box 80 in which chain 46 and its hook 47 are to be stocked when they are not used, a cut-off portion 81 being provided in platform 1 to permit the introduction of said chain into box 80.

It is to be understood that the invention is in no way limited to any specific embodiment and, more particularly, to those described with reference to the accompanying drawings, and that many modifications may be made thereto within the scope of the invention.

In particular, neither the winch, nor the loading carriage are indispensable.

When a loading carriage is provided to facilitate the loading and unloading of the barrow, said carriage may assume the most variegated shapes; its size may vary as required; it is also possible to vary the number of rolling trains of the carriage, at least two trains being however provided; the nature of the rolling means may also vary, as well as the locking and guiding means of said carriage in its loading position and so on.

It will be also understood that any one of the runnning wheel-trains may be orientably mounted to facilitate the driving of the wheeled barrow.

What I claim is:

1. A wheeled barrow comprising, in combination, a first-wheel train, a plane platform tiltably mounted about the axis of said first wheeltrain so that one of its edges can be brought into the close vicinity of the ground under the action of gravity to be engaged beneath an object to be moved, a second wheel-train mounted on a support pivoted on said platform between said first-wheel train and said engageable edge and having one position in which said platform is maintained substantially parallel to the ground on both wheel-trains, said support assuming automatically said position under the action of gravity when said engageable edge of said platform is sufficiently lifted above the ground by pivoting said platform about said first wheel-train, automatic locking means constituted by bars articulated upon an axis located beneath said platform, the free ends of said bars being brought, under gravitational action, into a right angle abutment against said support, substantially at the level of the axle of said second wheel train when the same is brought into said position, hand-operated means near the opposite edge of said platform to drive said barrow and to tilt said platform against the action of gravity, so as to bring said support into said position and means to unlock positively said locking means from said hand-operated means.

2. A wheeled barrow according to claim 1 in which said locking means are constituted by bars articulated on an axis located below the platform and the free ends of which are brought, under the action of gravity, into a right-angle abutment against said support substantially at the level of the axle of said second wheel-train, when the same is brought into its running position, and in which said unlocking means are constituted by a flexible link capable of lifting said bars, when subjected to a pulling stress, and secured at its free end to a lever pivoted on said hand operated means.

3. A wheeled barrow according to claim 1 in which said locking means are constituted by curved bars articulated at one end around the axle of said second wheel-train and slidably engaged at their other end in a yoke secured under said platform and by levers having a first arm pivoted about the axle of said first wheel-train, a second arm the end of which is capable of coming into abutment against that of the corresponding curved bar, when said support is brought into said position, and a third arm subjected to the action of elastic means urging said second arm towards said abutment position.

4. A wheeled barrow according to claim 1 in which said locking means are constituted by curved bars articulated at one end around the axle of said second wheel-train and slidably engaged at their other end in a yoke secured under said platform and by levers having a first arm pivoted about the axle of said first wheel-train, a second arm the end of which is capable of coming into abutment against that of the corresponding curved bar, when said support is brought into said position, and a third arm subjected to the action of elastic means urging said second arm towards said abutment position and in which said unlocking means are constituted by a flexible link acting at one end on said first lever arm so as to remove said second lever arm from said abutment position against the action of said elastic means and secured at its other end on a lever pivoted on said hand-operated means.

5. A wheeled barrow comprising, in combination, a first wheel-train, a plane platform tiltably mounted about the axis of said first wheel-train so that one of its edges can be brought into the close vicinity of the ground under the action of gravity to be engaged beneath an object to be moved, a second wheel-train mounted on a support pivoted on said platform between said first wheel-train and said engageable edge and having one position in which said platform is maintained substantially parallel to the ground on both wheel-trains, means to lock said support in said position, hand-operated means near the opposite edge of said platform to drive said barrow and to tilt said platform against the action of gravity, stress-multiplying hoisting means to load said object on the platform after said edge has been engaged beneath said object, a loading carriage to rollingly carry at least a portion of said object along said platform, said carriage being constituted by a plate having a small relative size with respect to said platform in the direction of the relative displacement between the same and said object, said plate being guided along the platform in said direction and by at least two rolling trains around one of which said plate can be tilted into a loading position in which one of its edges comes into contact with the ground to be engaged beneath said object, and by means to lock said loading carriage with respect to said platform as long as said object is not sufficiently engaged on said carriage to cause its tilting in the opposite direction.

6. A wheeled barrow according to claim 5 in which said carriage locking means are constituted by cut-off portions provided on the lateral edges of said platform near said first mentioned edge and into which the rollers of the outermost rolling train of said loading carriage are engageable.

7. A wheeled barrow according to claim 5 in which a flange is provided on the rear edge of said plate to make said object positively integral with said loading carriage during a loading operation.

MAURICE QUESNOIT.

REFERENCES CITED

The following references are of record in the file of this patent:

UNITED STATES PATENTS

| Number | Name | Date |
| --- | --- | --- |
| 272,106 | Watrous | Feb. 13, 1883 |
| 1,284,923 | Oliver et al. | Nov. 12, 1918 |
| 1,352,898 | Houck | Sept. 14, 1920 |
| 1,387,163 | Munzlinger | Aug. 9, 1921 |
| 1,905,321 | Velen | Apr. 25, 1933 |
| 2,470,637 | Olson | May 17, 1949 |

FOREIGN PATENTS

| Number | Country | Date |
| --- | --- | --- |
| 372,172 | Great Britain | May 5, 1932 |